United States Patent [19]
Reindl

[11] 3,944,927
[45]*Mar. 16, 1976

[54] DIGITAL TRANSMISSION SYSTEM
[75] Inventor: Adolf Reindl, Wayside, N.J.
[73] Assignee: The United States of America as represented by the Secretary of the Army, Washington, D.C.
[ * ] Notice: The portion of the term of this patent subsequent to Feb. 29, 1989, has been disclaimed.
[22] Filed: Sept. 1, 1971
[21] Appl. No.: 177,034

[52] U.S. Cl. ............ 325/38 A; 325/141; 179/15 AP
[51] Int. Cl.² ............................................. H04B 1/04
[58] Field of Search............ 325/38, 38 B, 141, 321; 179/15 AP, 15 AV, 15.55, 15 A; 178/DIG. 3

[56] References Cited
UNITED STATES PATENTS
3,646,445   2/1972   Reindl............................... 325/38 A Primary Examiner—George H. Libman
Assistant Examiner—Jin F. Ng
Attorney, Agent, or Firm—Nathan Edelberg; Robert P. Gibson; Jeremiah G. Murray

[57] ABSTRACT

A digital transmission system for transmitting quantized values of the extremal points of an analog wave. A PCM encoder quantizes the extremal points which are detected by an extremal detector. The PCM digital elements are transmitted to a first-in-first-out buffer under the control of a buffer control logic which is fed information concerning the rate of occurrence of the extremal points. The number of PCM digital elements transmitted will vary in number in accordance with a rule which is a function of the rate of occurrence of the extremal points. Generally, the number of elements per extremal sample decreases when the rate of occurrence of extremal samples increases and vice versa.

5 Claims, 1 Drawing Figure

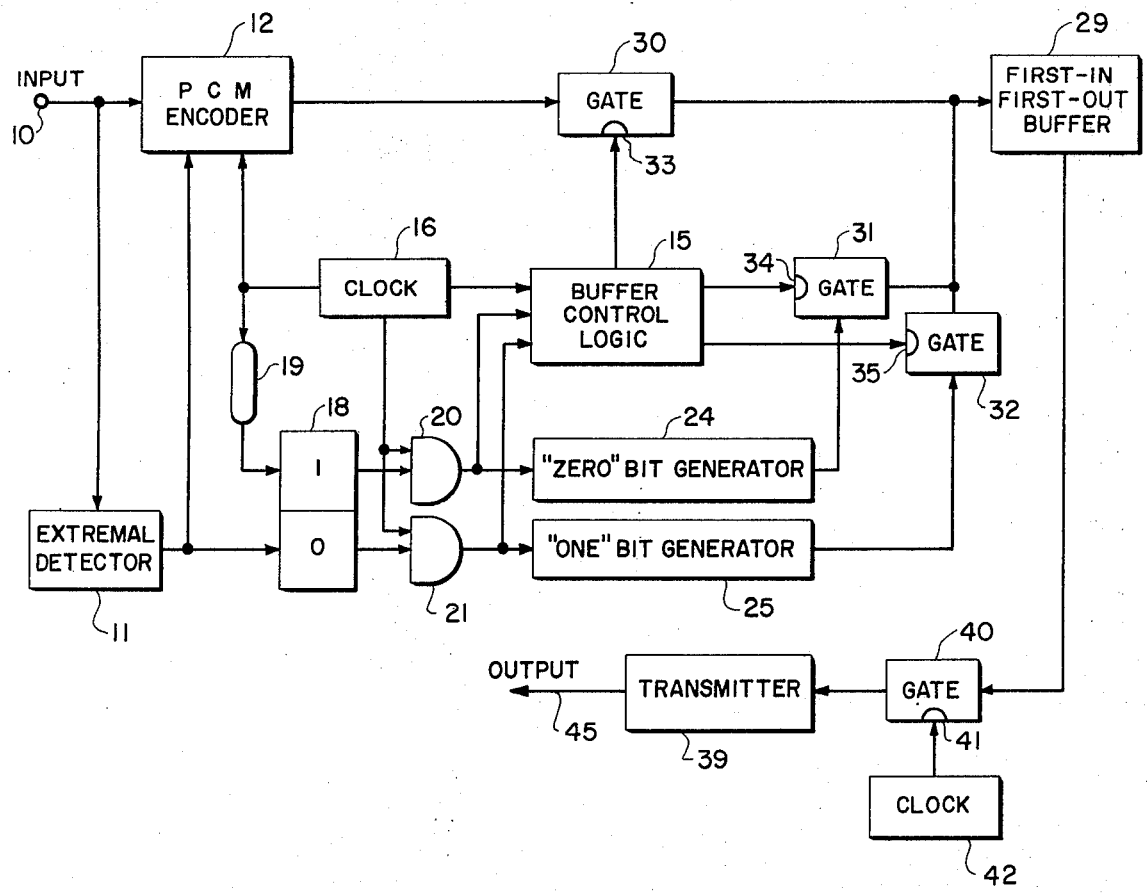

DIGITAL TRANSMISSION SYSTEM

The present invention relates to a system for transmitting digital signals and more specifically to a digital transmission system which optimizes the amount of intelligence transmitted for a given transmission bit rate and hence maximizes the transmission efficiency. The system involves the detection and transmission in a digital format, the extremal points of an analog wave. The receiving equipment reconstructs the analog signal by interpulating between the received extreme points. Analysis has shown that a speech wave with a 3000 cps upper frequency limit will contain, 1500 to 2500 extreme points per second, depending on the speakers voice characteristics. The maximum and minimum points of a 3000 cps sine wave are separated by 167 microseconds. This period of 167 microseconds determines the bit rate of the digital transmission system required for such a speech wave. For example, if pulse code modulation is utilized and the amplitude of each of the extremal samples is coded into a 4-bit 16 lever number, it will be necessary for the system to be capable of transmitting 4 binary bits within 167 microseconds or 24,000 bits per second. If each extremal sample is thus coded and transmitted as it occurs, the transmission bit rate will vary with the spectrum of the speech signal, being 24,000 bits per second for the highest speech frequency of 3000 cps and proportionally lower for the lower frequency components thereof. Thus, while the system must be designed to handle the maximum bit rate, it will be transmitting at this rate for only a small percentage of the time. This results in inefficient use of the system apparatus.

In accordance with the principles of the present invention, the transmission system efficiency is improved by varying the number of encoding levels or bits per extremal sample in accordance with a rule which is a function of the rate of occurrence of the extremal samples. In general, when the rate of extremal samples increases, the number of bits per extremal sample is decreased and vice versa. Thus, the instantaneous spectral composition of the analog signal determines the number of levels into which the extremal sample is quantized. Since the higher frequency components result in more extremal samples per unit time, the higher frequencies are coarsely quantized. Since more time is available for the transmission of the lower frequency components of the analog signal, these components will be finely quantized.

It is thus an object of the invention to provide an improved system of transmitting analog signals by pulse code modulation techniques.

A further object of the invention is to provide a system for transmitting extremal samples of an analog signal in a more efficient manner.

These and other objects and advantages of the invention will become apparent from the following detailed description and drawing which shows a block diagram of a preferred embodiment.

Referring now to the drawing, there is shown a digital transmission system having an input terminal 10 for accepting an analog input voltage such as the output of an audio transducer. The input terminal 10 is connected to the inputs of a PCM encoder 12 and an extremal detector 11. Extremal detector 11 generates an output pulse at each instant the input voltage passes through an extremal point, i.e. a maximum or a minimum. Extremal detectors are well known in the art and will not be described in detail here.

PCM encoder 12 encodes the extremal analog voltages on terminal 10 under the control of the output of detector 11 and clock 16.

The output of extremal detector 11 is also connected to the set side of a flip-flop 18. The reset side of flip-flop 18 is connected to the output of clock 16 via a time delay 19. The complimentary outputs of flip-flop 18 are connected to one of the inputs of the two-input AND gates 20 and 21. The other inputs to AND gates 20 and 21 are connected to the output of clock 16.

A buffer control logic 15 has three inputs for accepting signals from the outputs of clock 16, AND gate 20 and AND gate 21. The output of AND gates 20 and 21 are also connected to the input of a "zero" bit generator 24 and a "one" bit generator 25 respectively.

A first-in-first-out buffer 29 has the input thereof connected to the output of encoder 12, "zero" bit generator 24 and "one" bit generator 25 via transmission gates 30, 31 and 32, respectively. Transmission gates 30, 31 and 32 have enable terminals 33, 34 and 35 respectively connected to three outputs of buffer control logic 15. The output of buffer 29 is connected to a transmitter 39 via transmission gate 40 having an enable terminal 41 which is controlled by the output of a clock 42. The output of transmitter 39 is connected to an output line 45 for transmitting the digital information in any well-known manner.

As explained above, it is the function of the system to transmit a series of binary pulses which represent an encoding of the extremal analog voltages at the input terminal 10. It is also intended that the transmission rate be constant and relatively current even though the rate of occurrence of the extremal points may be varying. In the present system the information transmitted is kept relatively current while maintaining a constant transmission rate by selectively dropping a predetermined number of the least significant bits from the encoded signal when the rate of occurrence of the extremal points increases.

In the system shown in the figure, the buffer control logic 15 detects the rate of occurrence of the extremal points via the three inputs from clock 16 and AND gates 20 and 21. In response to these inputs, the buffer control logic 15 selectively enables transmission gate 30 such that the number of binary bits inserted in buffer 29 from PCM encoder 12 will depend on the rate of occurrence of the extremal voltages on input terminal 10. As the rate of occurrence of the extremal voltages increases, only a few of the most significant PCM bits are transmitted from encoder 12 to buffer 29. when the rate of occurrence of the extremal points is low, all or most of the PCM bits from encoder 12 are transmitted to buffer 29 via gate 30.

Since the number of bits used to encode the extremal voltages varies, it will be necessary to include in the transmitted signal information about the rate of occurrence of the extremal voltages. In the system shown in the figure, this information is inserted in the buffer 29 via gates 31 and 32 which are selectively enabled by buffer control logic 15. Very simply, this information will take the form of a logical "one", if an extremal point has occurred, followed by a plurality of PCM bits which will be an encoding of the extremal voltage value. At all other times, logical "zeros" will be transmitted.

To illustrate the inventive concept in more detail, a specific example will now be given. Assume that the PCM encoder 12 is capable of encoding the input analog voltages into a 6-bit binary word. Therefore, the input extremal points will be quantized by the PCM encoder 12 into 64 different levels. Also assume that the clock 16 has a rate which is one-third the rate of clock 42.

Initially, the buffer 29 will contain all "zeros" and the flip-flop 18 will be in the reset state with a logical "one" at the input to AND gate 20 and a logical "zero" at the input to AND gate 21. With the system in this state and with no input signal on terminal 10, the buffer control logic 15 will receive input signals from the outputs of clock 16 and AND gate 20. The "zero" bit generator 24 will also be energized with each output pulse from AND gate 20. In response to the input signal from AND gate 20, the buffer control logic 15 will energize enable terminal 34 of transmission gate 31 and a logical "zero" will be stored in the buffer 29. This process will continue and a plurality of logical "zeros", one for each clock pulse of clock 16, will be stored in buffer 29.

Simultaneously, the transmitter 39 will be transmitting logical "zeros" from the empty buffer 29 at the rate determined by the clock 42. The receiver simply receives a series of logical "zeros" which simply means that no extremal points have occurred and therefore no information is present at the input terminal 10.

With information on terminal 10, extremal voltages will be periodically detected. For each extremal voltage detected, the detector 11 will set flip-flop 18 and send a signal to PCM encoder 12 which in turn will generate a 6-bit binary coded representation of the value of the extremal voltage on terminal 10. With the occurrence of the first clock pulse from clock 16 following the detection of an extremal voltage, AND gate 21 will generate an output pulse which energizes "one" bit generator 25. Buffer control logic 15 also receives the output of AND gate 21 and responds by first enabling gate 32 via enable terminal 35 and then enabling gate 30 a predetermined number of times via enable terminal 33. As a result, the "one" bit generator 25 transmits a logical "one" to buffer 29 via gate 32 to indicate that an extremal voltage has occurred. The PCM encoder 12 will then transmit a predetermined number of the PCM bits to buffer 29 via gate 30. The number of bits transmitted from PCM encoder 12 to buffer 29 will be equal to the number of times the enable terminal 33 is energized by buffer control logic 15, which in turn will be a function of the most recent rate of occurrence of the extremal voltages.

For example, the buffer control logic 15 may be designed such that the output function of the line connected to enable terminal 33 is as follows:

1. terminal 33 is not energized and gate 30 is not enabled if no extremal voltage is detected in a clock period, and
2. if an extremal voltage is detected in a clock period, terminal 33 is initially energized six times so that all 6 PCM bits are transmitted to buffer 29, and
3. if extremal voltages are detected in two successive clock periods then reduce by one the number of times that terminal 33 is energized so that the number of PCM bits transmitted to buffer 29 is reduced by one starting with the least significant bit, and
4. repeat step 3 until the number of PCM bits transmitted to buffer 29 in one clock period is only the 2 most significant bits, and
5. increase by one the number of times terminal 33 is to be energized for each pair of successive clock periods in which extremal voltages are not detected, and
6. repeat step 5 until the number of times terminal 33 is energized in a clock period equals 6 and all PCM bits are again transmitted.

Of course, the above truth table which specifies completely the buffer control logic 15 is only an example. Other rules could be specified which will accomplish the desired function of managing the number of PCM bits to be transmitted such that when the rate of occurrence of the extremal voltages increases the number of PCM bits per codeword decreases and vice versa.

Using the rules specified above, two examples of a string of transmitted bits will now be given. In each example, the space between the bits has no timing significance and is provided simply to separate the PCM bits from the control bits generated by the generators 24 and 25.

Example 1.

1 101011 1 01100 1 1101 1 010 1 10 1 00 1 11 1 01 1 10. This example represents a series of nine successive sampling time periods each containing an extremal voltage. The first logical "one" is a control bit and represents the output of the "one" bit generator 25, indicating that an extremal voltage was detected in that time period. The group of 6 PCM binary bits that follow (010011) is the entire codeword which represents the quantized voltage value of the extremal voltage. The next logical "one", i.e., the eighth bit, represents the control bit for the second time period. The group of 5 PCM bits that follow (01100) contain the five most significant bits of the codeword which represents the quantized voltage value of the extremal voltage which occurred in the second time period. It should now be evident that since each of the nine successive time periods had an extremal voltage therein, the number of PCM bits in the codeword successively decreased by one until only 2 PCM bits are transmitted for each extremal value.

Also, since there are a total of 37 binary bits transmitted in the above string of bits and since the clock 16 has a period of three times the period of clock 42, then it will take a total of over 12 periods of clock 16 for transmitter 30 to transmit the 37 bits. The difference in time involved between the buffer 29 input and output will result in a slow buildup or storage of bits in the buffer 29. However, because in normal conversation and under most conditions this buildup will not continue for any substantial time, the contents of buffer 29 will soon be reduced. This can be seen from the next example.

Example 2.

1 01 1 11 0 1 101 1 01 0 0 1 1001 0 1 10101 0 0 1 010011. This stream of bits could be considered as starting where the bit stream of Example 1 left off. The number of bits to be transmitted in the above example is again equal to 37 and therefore represents the same total transmission time as in Example 1. However, because the number of control bits in the above stream is equal to the number of clock periods of clock 16, the total input time is more than in the case of Example 1. There are 13 control bits in the above bit stream and they appear in the bit positions 1, 4, 7, 8, 12, 15, 16, 17, 22, 23, 29, 30 and 31. Since the total transmission time is now less than the input time, there will be a slow reduction in the contents of buffer 15.

It will be evident that there will be some finite time delay introduced due to the buildup of the bits in buffer 29. However, under most conditions, this time delay is relatively small and insignificant.

It is also evident that during certain periods, the extremal voltages are encoded with fewer bits than at other times. However, under most conditions, the signal is not appreciably effected as mentioned earlier. This is true because at higher frequencies, inaccuracies in amplitude are not as important as at lower frequencies where the signal is more accurately encoded.

It should be undersood, of course, that the foregoing disclosure relates to only a preferred embodiment of the invention and that numerous modifications or alterations may be made therein without departing from the spirit and the scope of the invention as set forth in the appended claims.

What is claimed is:

1. A digital transmission system for transmitting in digital format the extremal points of analog input wave comprising: an input terminal means for receiving said analog input wave; extremal detector means connected to said input terminal for detecting the occurrence of extremal points on said analog input wave; digital encoder means connected to said input terminal means and to the output of said extremal detector means for encoding the amplitude of said extremal points into a digital word having a predetermined number of digital elements; sampling clock means for generating a clock signal at a sampling rate; rate indicator means connected to the output of said sampling clock means and to the output of said extremal detector means for indicating the rate of occurrence of said extremal points; first-in-first-out buffer means for storing digital elements; transmission means, including transmission clock means, connected to the output of said buffer means for transmitting digital elements out of said buffer means at a transmission rate; and buffer control means connected to the output of said sampling clock means and to the output of said rate indicator means for transmitting a predetermined number of the most significant said digital elements from the output of said digital encoder means to the input of said buffer means in accordance with a function which varies inversely with respect to the rate of occurrence of said extremal points.

2. The device according to claim 1 and wherein said digital encoder means is a pulse code modulation binary encoder.

3. The device according to claim 2 and further including rate bit generator means connected to the output of said rate indicator means for generating a binary control bit for each extremal sample detected; and gate means controlled by said buffer control means for inserting said binary control bits in said buffer.

4. The method of transmitting in digital format the extremal points of an analog wave comprising: encoding each of said extremal points into a digital word having a predetermined number of digital elements; determining the rate of occurrence of said extremal points; and transmitting a variable number of the most significant binary elements of said digital words in accordance with a function which varies inversely with respect to said rate of occurrence of said extremal points.

5. The method according to claim 4 wherein said digital elements are binary bits.

* * * * *